D. S. SEYMOUR.
SEWING MACHINE.
APPLICATION FILED JUNE 16, 1915.
1,354,783.
Patented Oct. 5, 1920.
5 SHEETS—SHEET 5.
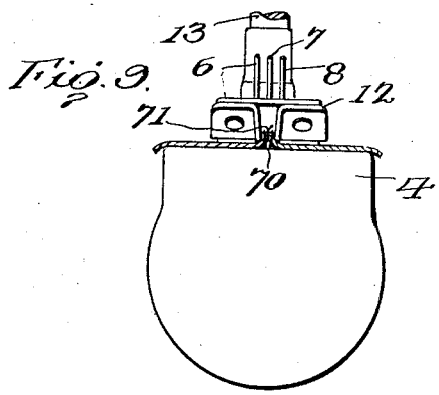
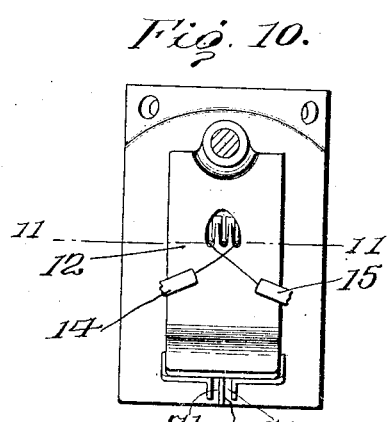
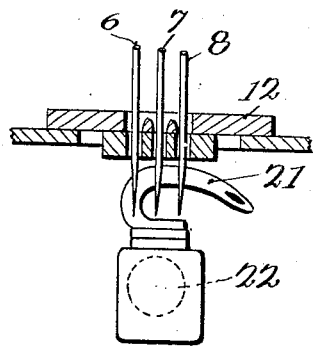
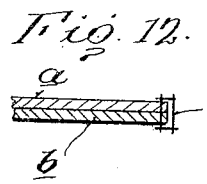
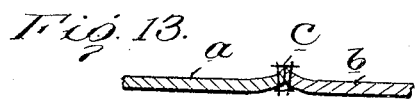
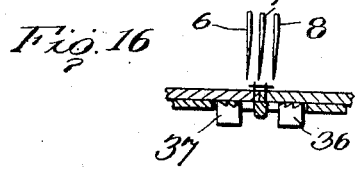
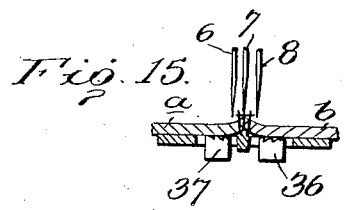
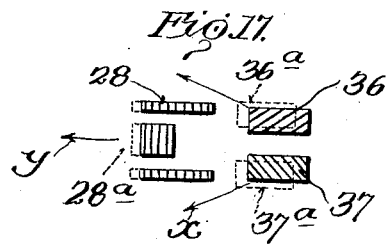
Witnesses
Inventor
Dudley S. Seymour
By Sturtevant Mason
Attorneys

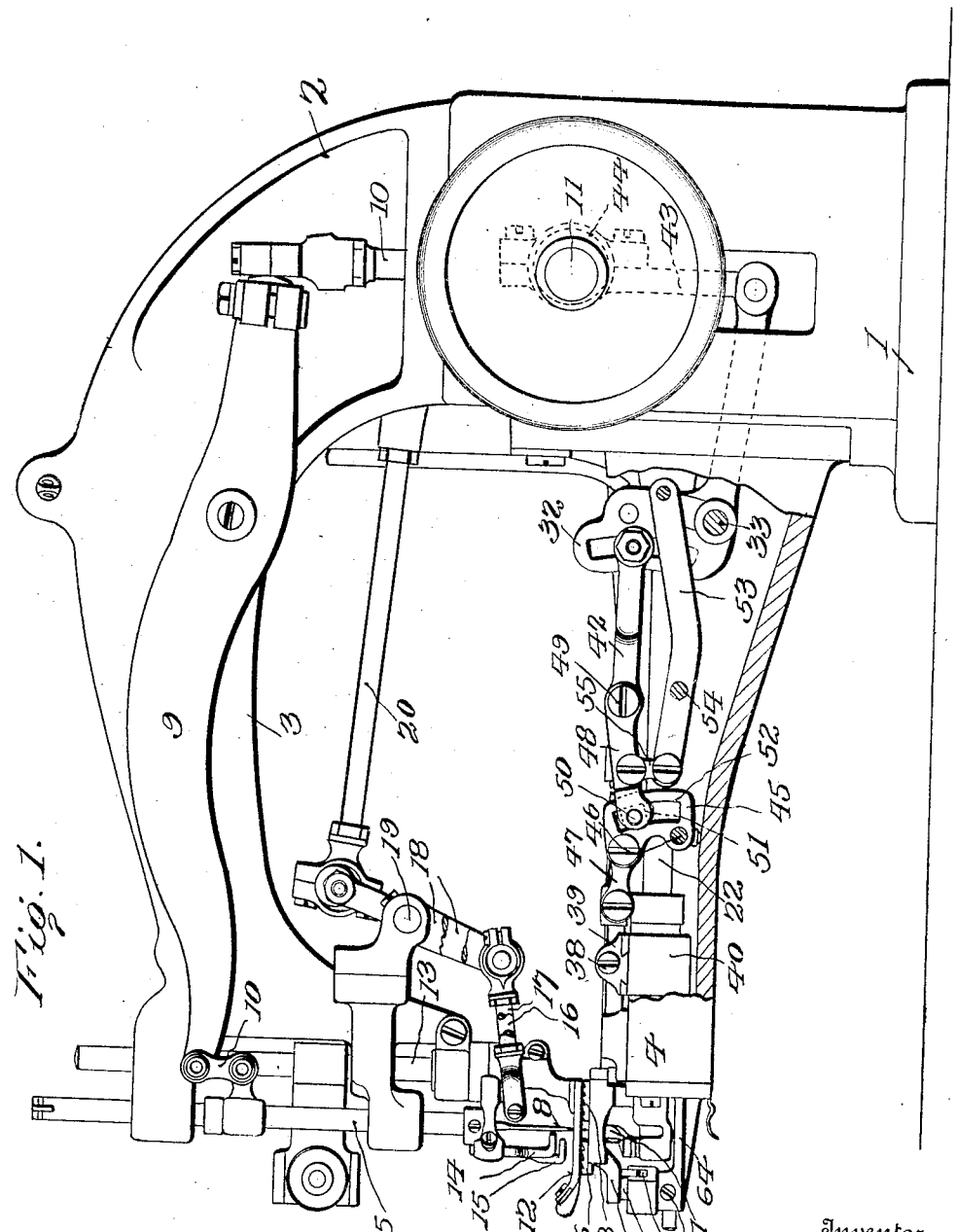

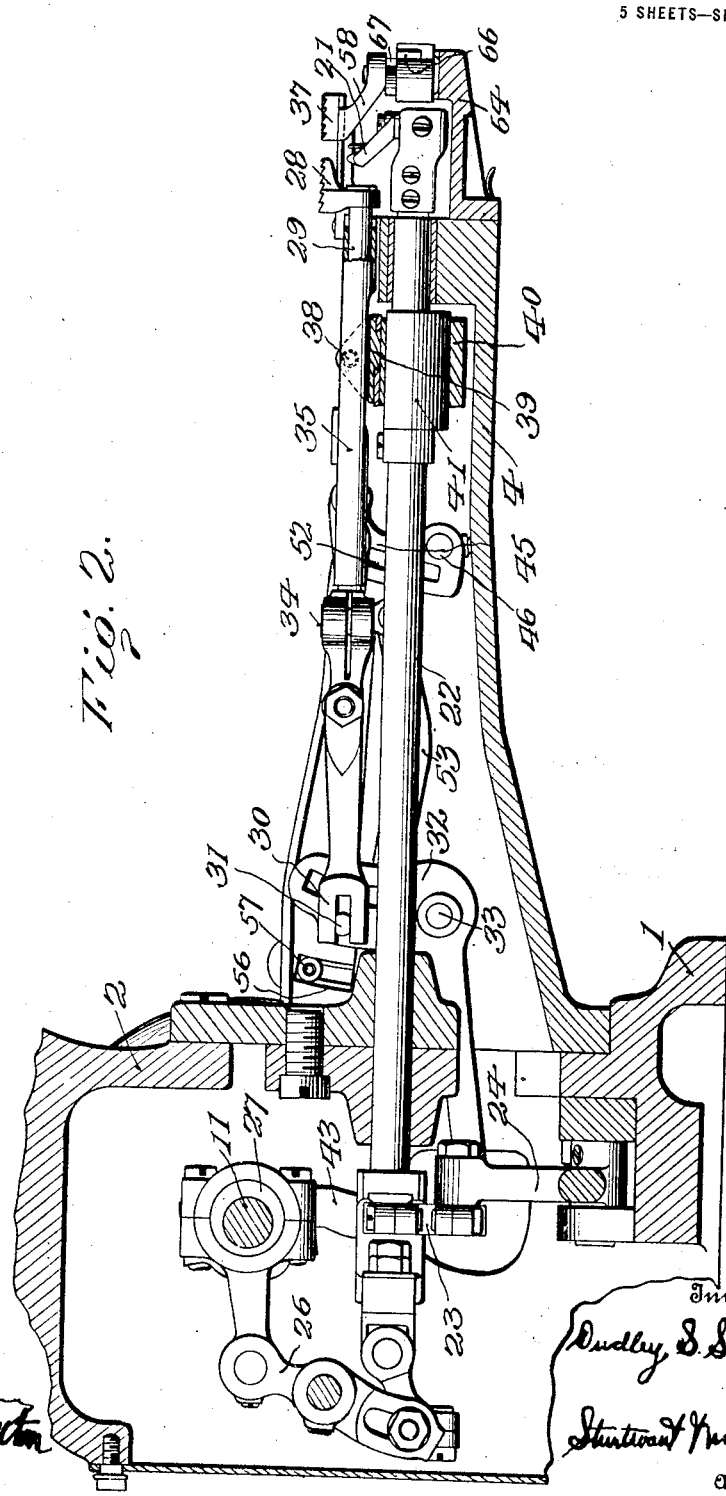

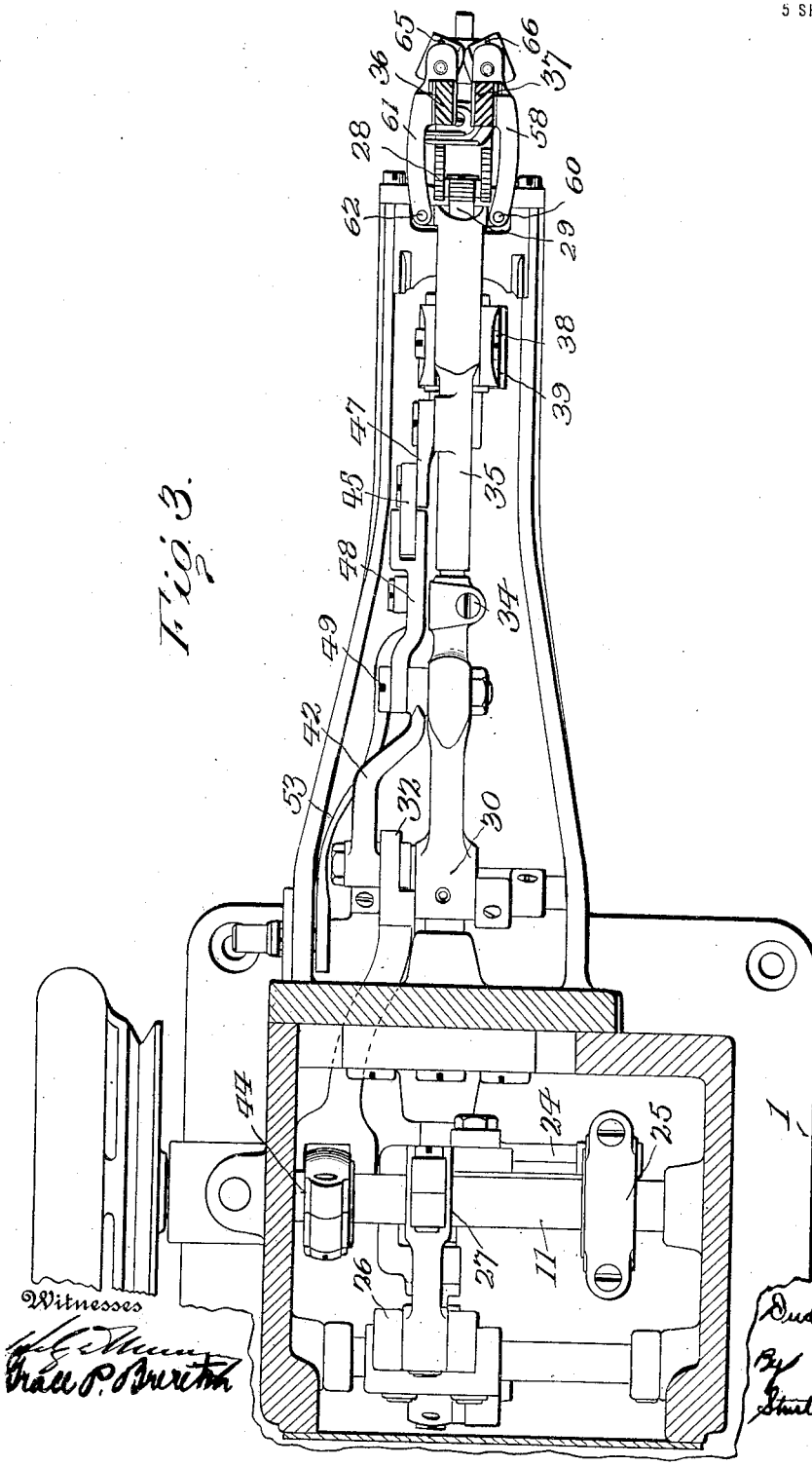

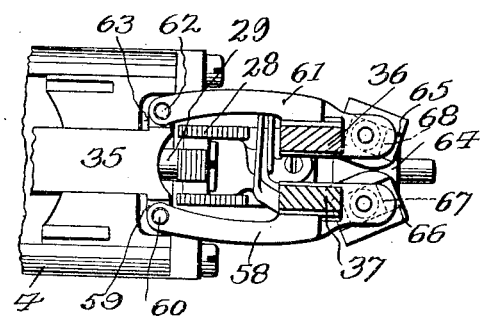
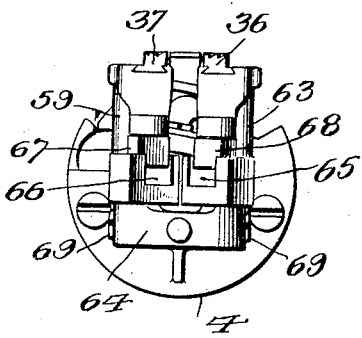
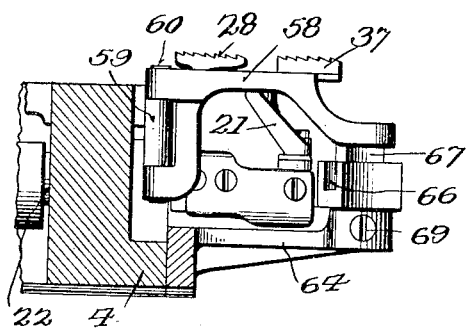
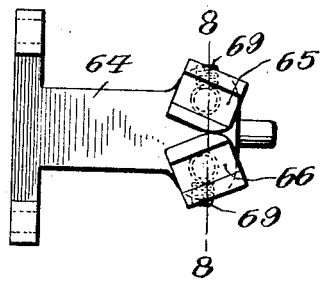
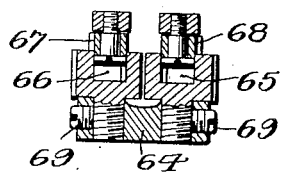

UNITED STATES PATENT OFFICE.

DUDLEY S. SEYMOUR, OF OAK PARK, ILLINOIS, ASSIGNOR TO UNION SPECIAL MACHINE COMPANY, OF CHICAGO, ILLINOIS, A CORPORATION OF ILLINOIS.

SEWING-MACHINE.

1,354,783.     Specification of Letters Patent.     Patented Oct. 5, 1920.

Application filed June 16, 1915. Serial No. 34,478.

*To all whom it may concern:*

Be it known that I, DUDLEY S. SEYMOUR, a citizen of the United States, residing at Oak Park, in the county of Cook, State of Illinois, have invented certain new and useful Improvements in Sewing-Machines, of which the following is a description, reference being had to the accompanying drawing and to the figures of reference marked thereon.

The invention relates to new and useful improvements in sewing machines, and more particularly to a sewing machine having mechanism for covering previously joined edges of fabric sections.

An object of the invention is to provide mechanism for exerting a strain on the fabric sections prior to, or as they are being covered by the stitch-forming mechanism, so that the seam will be substantially flat.

A further object of the invention is to provide a mechanism of the above character wherein feed dogs engage the respective fabric sections in advance of the stitching mechanism, and said feed dogs are moved away from each other as well as in the direction of feed for exerting a strain on the joined edges as they are being covered by the stitch-forming mechanism.

A further object of the invention is to provide a mechanism of the above character wherein the feed dogs in advance of the needles may be given a differential movement relative to a main feed dog in rear of the needles, so that as the fabric is fed to the stitching mechanism and a transverse strain exerted on the fabric sections, said fabric sections will be fulled in in front of the needles to avoid stretching in a direction lengthwise of the seam.

These and other objects will in part be obvious, and will in part be hereinafter more fully disclosed.

In the drawings, which show by way of illustration one embodiment of the invention,—

Figure 1 is a side view of a sewing machine embodying my improvements, parts of the work support being broken away and the throat plate, and end cap being omitted to show the feed-operating mechanism;

Fig. 2 is an enlarged sectional view lengthwise of the work support, showing the looper support and the feeding mechanism as viewed from the opposite side of the machine;

Fig. 3 is a view partly in section and partly in plan, showing the feeding mechanism and the means for stretching the fabric as it is fed to the stitching mechanism;

Fig. 4 is a detail showing the end of the work support, the main feed dog, the auxiliary feed dogs and the mechanism for operating the same in plan view;

Fig. 5 is a view partly in section and partly in side elevation of the same;

Fig. 6 is an end view of the same;

Fig. 7 is a detail showing the supporting bracket and the guideways for directing the movements of the stretching feed dogs;

Fig. 8 is a sectional view on the line 8—8 of Fig. 7;

Fig. 9 is a detail showing the work support and presser foot in front end view;

Fig. 10 is a top plan view of the presser foot and a portion of the work support, also showing the thread-laying fingers;

Fig. 11 is a sectional view on the line 11—11 of Fig. 10;

Fig. 12 is a sectional view showing more or less diagrammatically fabric sections having their edges joined preparatory to covering by my improved stretching and stitching mechanism;

Fig. 13 is a sectional view showing the sections of the fabric folded out and as first presented to the covering mechanism;

Fig. 14 shows the sections under strain and the edges drawn into the plane of the fabric sections and covered by the covering mechanism;

Fig. 15 is a sectional view showing the position of the feed dogs prior to the stretching action;

Fig. 16 is a similar view showing the position of the feed dogs after the fabric has been stretched;

Fig. 17 is a view showing in plan the main feed and the auxiliary feed dogs; also in dotted lines the movements of these feed dogs.

The invention consists generally in providing a stitch-forming mechanism which includes spaced needles with which a single looper coöperates beneath the work support for connecting the lines of needle loops, and thread-laying fingers coöperating with the needles above the work support for joining the needle loops. This stitch-forming mechanism may include a third needle passing centrally through the seam and the entire stitching mechanism is of the well known type of seam-covering mechanism. The fabric sections are preferably joined previous to being covered, and as they are fed to the stitch-forming mechanism, stretching dogs engage the respective fabric sections in advance of the needles, and these dogs are moved in a direction substantially transverse of the line of feed as they move forwardly, so as to exert a strain upon the joined edges of the fabric sections, and this will pull the sections and thereby flatten the seam. These fabric sections are preferably fed under strain to the stitching mechanism which covers the edges, as above noted. A main feed dog engages the stitched fabric sections in rear of the needles, and conveys the same away from the stitch-forming mechanism.

The feed dogs in advance of the needles which operate to place the fabric sections under strain, are also preferably given a differential feeding movement, so that when operating upon elastic knit fabrics, the feeding of the stretching dogs in the line of seam will be slightly faster than the feed of the fabric sections away from the stitch-forming mechanism, and this fulling in of the fabrics prevents the same from being stretched in the line of seam.

Referring more in detail to the drawings, my improved sewing machine includes a supporting base 1 from which rises a standard 2 having an overhanging arm 3. Also projecting from the standard 2 is a cylindrical work-supporting arm 4. Mounted on the overhanging arm is a needle bar 5 carrying three needles 6, 7, and 8. The needle bar is reciprocated by a needle lever 9, oscillated by a link 10 from the main shaft 11, which as herein shown extends crosswise of the work-supporting arm.

A presser foot 12 is carried by a presser bar 13 mounted in the overhanging arm. Coöperating with the three needles above the work support, are thread-laying fingers 14 and 15. These thread-laying fingers are mounted on the overhanging arm, and are connected by links 16 and 17 respectively with arms 18 of a rock lever pivoted at 19 to the overhanging arm and oscillated by a link 20 from a suitable cam, which in turn is rotated by the main shaft of the machine. This thread-laying mechanism forms *per se* no part of the present invention and further description thereof is not thought necessary.

Coöperating with the needles below the work support is a looper 21, fixed to the forward end of a looper-supporting shaft 22. This looper-supporting shaft is mounted to oscillate in suitable bearings in the work-supporting arm. Said looper shaft receives its oscillations from a link 23, connected with a rock lever 24, and this rock lever is oscillated from a suitable eccentric on the main shaft through the eccentric strap 25. The looper support 22 is moved endwise for giving the looper a needle-avoiding movement through a rock lever 26, which is oscillated by an eccentric 27 on the main shaft 11. This looper mechanism *per se* likewise forms no part of the present invention, and further description thereof is not thought necessary.

The fabric is fed away from the stitch-forming mechanism by a main feed dog 28. This main feed dog, as herein shown, is located wholly in rear of the needles and engages the fabric sections after they are stitched together and conveys the same away from the stitching mechanism. Said main feed dog 28 is fixed to the forward end of a feed bar 29. The rear end of this feed bar 29 is forked as at 30 and slidingly engages a pin 31 carried by a rock lever 32 fulcrumed at 33 on the work-supporting arm. The feed bar 29 is formed in two sections, clamped together by a suitable screw 34. The forward section of the feed bar 29 is in the form of a rod, and on this rod is a sleeve 35. Engaging the fabric sections in advance of the needles are two stretching dogs 36 and 37. These dogs are located respectively on opposite sides of the center line of the seam. The dogs 36 and 37 are supported by this sleeve 35, so they are moved back and forth by an endwise movement of the sleeve 35. Said sleeve 35 is pivoted at 38 to a supporting plate 39, which has a dovetailed connection with an eccentric strap 40 coöperating with an eccentric 41 on the looper-supporting shaft 22. As the shaft 22 oscillates, this eccentric 41 will raise and lower the sleeve 35, and as the feed bar 29 extends through the sleeve, said feed bar 29 will also be raised and lowered.

The stretching dogs 36 and 37 are carried by the sleeve 35, and, therefore, the stretching dogs and the main feed dog will all be simultaneously raised into engagement with the fabric through the action of this eccentric 41. The sleeve 35 may move endwise on the feed bar 29, independent of the endwise movements of said feed bar. The feed bar 29 is moved endwise by a link 42 pivoted to the lever 32. Said lever 32 has a segmental slot therein, and the pivotal connection between the link 42 and the lever may, therefore, be adjusted. Said lever 32 is oscillated by a link 43, which coöperates with a suitable eccentric 44 on the main shaft 11. As the main shaft rotates, this will oscillate the lever 32, and through the link 42 will move the feed bar 29 endwise. The feed bar 29 will slide on the pin 31 during this movement, although the pin 31 is moved with the feed bar.

The sleeve 35 is moved endwise by a lever 45, fulcrumed at 46 to the work-supporting arm. This lever is connected by a link 47 to the sleeve 35. The lever is also connected by a second link 48 with the main feed bar at the pivot 49 where the link 42 likewise joins said main feed bar. The link 48 carries a pin 50, which extends through a block 51 located in a segmental slot 52 formed in the lever 45. This permits the link 48 to be adjusted so as to vary its connection with the lever 45.

A hand-operated lever 53 is pivoted at 54 to the work-supporting arm, and is connected by a link 55 to the operating link 48 for the lever 45. This hand lever 53 at its rear end is provided with a pin extending through a slot 56 in the work-supporting arm. Any suitable means may be used for holding said lever in various adjusted positions. A stop screw 57 may also be provided at the end of the slot for limiting the movement of this hand lever.

When the hand lever is raised to its extreme upper position, the link 48 will be shifted toward the fulcrum point 46 of the lever 45, and, therefore, the movement imparted to the sleeve supporting the auxiliary feed dogs will be a maximum.

A movement of the hand lever in the opposite direction will raise the link 48, and the throw imparted to the sleeve carrying the auxiliary feed dogs will be substantially the same as the throw of the main feed bar, so no differential feeding movement will be given to said auxiliary feed dogs.

One of the principal purposes of my improved feeding mechanism is for covering the edges of fabric sections which have been previously joined. In Fig. 12 of the drawings I have shown two fabric sections $a$ and $b$, which are joined by overseaming stitches $c$. The fabric sections $a$ and $b$, as shown in Fig. 13, are folded out for the purpose of making a flat seam. As these sections are folded out, the stitches $c$ hold the edges from turning readily on each other to a flat position. The fabric sections in this condition are fed to my improved feeding and stretching mechanism.

The feed dogs 36 and 37 engage the respective fabric sections on the opposite sides of the joining threads, as clearly shown in Fig. 15 of the drawings. As these feed dogs 36 and 37 move forward, they also move away from each other, as clearly shown in Fig. 15, and this draws the two sections $a$ and $b$ down in the same plane and causes the two edges to abut, so when they are conveyed to the needles 6, 7 and 8 the needles will pass through the flat abutted fabric sections and cover the same, thus making a flat seam.

In Fig. 17 of the drawings, I have shown the movements of feed dogs. The main feed dog is illustrated at 28 and in dotted line position 28ª I have shown the forward movement of this feed dog. The feed dogs 36 and 37 are also shown at their forward positions at 36ª and 37ª respectively. The arrows $x$, $x$ and $y$ indicate the forward movements of the feed dogs.

This movement of the feed dogs 36 and 37 is accomplished by the following means: The feed dog 37 is secured to a supporting arm 58. The sleeve 35 has a downwardly projecting forward end carrying a lug 59. The arm 58 is forked so as to extend above and below the lug 59, and a pivot pin 60 passing through the forked end of the arm 58 and the lug 59 supports said arm.

The feed dog 36 is carried by an arm 61, likewise pivoted by a pin 62 to a vertical lug 63 carried by the sleeve 35. This makes a strong and durable support for the feed dogs 36 and 37, and at the same time permits the feed dogs to swing with the arms about the pins 60 and 62 respectively.

A bracket 64 is clamped to the ends of the work support and projects forwardly therefrom. Said bracket is formed with two guideways 65 and 66. The arm 58 carries a pivoted block 67 adapted to slide in the guideway 66, while the arm 61 carries a block 68 adapted to slide in the guideway 65. These guideways are adjustably secured to the bracket 64 by suitable screws 69. By loosening these screws 69 the angular position of the guideways 65 and 66 may be varied.

As the feed dogs move back and forth, these blocks will slide in the guideways and the guideways if set as shown in Fig. 7 will cause said feed dogs to be separated from each other on their forward movement. Each feed dog 36 and 37 is provided with a serrated face, the teeth of which project in the general direction in which the dog moves for feeding and stretching the fabric.

In the operation of my device, the fabric sections $a$ and $b$ are joined on a previous machine and are then folded out to the position shown in Fig. 13. In this position they are fed to the machine. A rib 70 on the work support projects into a groove 71 in the presser foot, and this guides the fabric sections underneath the presser foot and directs the joined edges so they will pass centrally between the outside needles of the stitching mechanism.

The feed dogs 36 and 37 first engage the fabric sections and as these feed dogs move forward they also move away from the center line of the feed, and this puts a strain on the fabric sections which draws them into the flat position shown in Fig. 16. These feed dogs 36 and 37 engage the lower face of the presser foot, and said presser foot will assist in holding the fabric sections stretched as they are delivered to the stitch-forming mechanism.

The stitch-forming mechanism as herein shown consists of three needles, the center one passing substantially between the abutted edges of the fabric sections, while the outside needles pass through the respective fabric sections. The looper 21 coöperating with all three needles lays a joining thread between the needle loops below the fabric, while the thread-laying fingers above the presser foot lay joining threads between the the needle loops above the fabric. This effectively covers the joined edges of the fabric, and as they are drawn to a flat position prior to the stitching, they will be held in this flat position.

The feed dogs 36 and 37 as above described may be given a differential movement relative to the main feed dog so as to feed the fabric sections to the needles by a slight fulling movement, which will prevent the fabric from being stretched in a direction lengthwise of the seam, although the fabric sections are stretched in a direction transversely of the line of seam.

While I have described my machine as especially adapted for covering the edges of fabric sections which have been previously joined by an overseaming stitch which permits the edges to be abutted in forming a flat seam, it will also be understood my invention may be used for covering edges of fabric sections joined by through-and-through stitches.

While I have described a covering mechanism wherein the joined edges are covered by threads, it will also be understood that other forms of covering mechanisms may be used in connection with my combined stretching and feeding dogs.

While I have described my fabric feeding and stretching mechanism as adapted to be used in connection with a covering mechanism for covering seams, it will be understood this feeding and stretching mechanism may be used without any covering mechanism, in which case the machine would then become a preparing machine for stretching joined edges of fabric, so as to flatten the same, and the fabric would then be operated upon in another machine if desired for covering the seam.

It is obvious that minor changes in the details of construction and arrangement of parts may be made, without departing from the spirit of the invention as set forth in the appended claims.

Having thus described my invention, what I claim as new and desire to secure by Letters Patent, is:—

1. The combination of stitch-forming mechanism including a plurality of needles, a looper coöperating with the needles beneath the work support, cross thread laying mechanism coöperating with the needles beneath the work support whereby the joined edges of the fabric sections may be covered, mechanism for engaging the respective fabric sections wholly in advance of the needles and placing the same under strain in a direction transversely of the line of seam.

2. The combination with stitch-forming mechanism for covering the joined edges of fabric sections, of feeding devices wholly in advance of the stitch-forming mechanism for engaging the fabric sections and exerting a transverse strain thereon, and feeding devices wholly in the rear of the stitch-forming mechanism for engaging the fabric sections and feeding the same away from the stitch-forming mechanism.

3. The combination with stitch-forming mechanism for covering the joined edges of fabric sections, of feeding mechanism for feeding the fabric sections including feed dogs engaging the sections wholly in front of the stitch-forming mechanism, and means for moving said dogs away from each other during their feeding action.

4. The combination of stitch-forming mechanism and a feeding mechanism including feed dogs engaging the fabric wholly in front of the stitch-forming mechanism, and means for moving said dogs away from each other during the feeding action thereof.

5. The combination of stitch-forming mechanism and feeding mechanism including a main feed dog engaging the fabric in rear of the needles, and auxiliary feed dogs for engaging the fabric in front of the stitch-forming mechanism, and means for moving said auxiliary feed dogs away from each other during their feeding action.

6. The combination of stitch-forming mechanism and feeding mechanism including a main feed dog engaging the fabric in rear of the needles, auxiliary feed dogs for engaging the fabric in front of the stitch-forming mechanism, and means for moving said auxiliary feed dogs away from each other during their feeding action, and means for giving the auxiliary feed dogs a differential feeding movement relative to said main feed dog.

7. The combination of stitch-forming mechanism and feeding mechanism including a main feed dog in rear of the stitch-forming mechanism, two auxiliary feed dogs placed side by side in advance of the stitch-forming mechanism, and means for moving said auxiliary feed dogs away from each other during the feeding movement thereof.

8. The combination of stitch-forming mechanism and feeding mechanism including a main feed dog in rear of the stitch-forming mechanism, two auxiliary feed dogs placed side by side in advance of the stitch-forming mechanism, means for moving said auxiliary feed dogs away from each other during the feeding movement thereof, and means for giving said auxiliary feed dogs a differential movement relative to said main feed dog.

9. The combination of stitch-forming mechanism and feeding mechanism including a main feed dog in rear of the stitch-forming mechanism, auxiliary feed dogs in advance of the stitch-forming mechanism, and means for moving said auxiliary feed dogs in paths inclined away from each other while in engagement with the fabric.

10. The combination of stitch-forming mechanism and feeding mechanism including a main feed dog in rear of the stitch-forming mechanism, auxiliary feed dogs in advance of the stitch-forming mechanism, and means for moving said auxiliary feed dogs in paths inclined away from each other while in engagement with the fabric, said means including devices for giving said auxiliary feed dogs a differential movement relative to the main feed dog.

11. A feeding mechanism including in combination, a feed bar, two auxiliary feed dogs, a supporting arm pivoted to the feed bar and carrying each feed dog, means for swinging said arms in opposite directions during the feeding movements of the feed bar for causing said feed dogs to stretch the fabric.

12. A feeding mechanism including in combination, a feed bar, two feed dogs arranged side by side, arms pivotally carried by said feed bar for supporting the respective feed dogs, a supporting bracket, guideways carried thereby and coöperating with the respective arms for directing the movements thereof as said feed bar moves back and forth.

13. A feeding mechanism including in combination, a feed bar, two feed dogs arranged side by side, arms pivotally carried by said feed bar for supporting the respective feed dogs, a supporting bracket, guideways carried thereby and coöperating with the respective arms for directing the movements thereof as said feed bar moves back and forth, and means whereby said guideways may be adjusted.

14. The combination of stitch-forming mechanism and a feeding mechanism including a feed bar, feed dogs arranged side by side in advance of the stitching mechanism, arms pivoted to the feed bar in rear of the stitching mechanism and projecting forwardly and supporting the respective feed dogs, a supporting bracket, guideways carried by said bracket for directing the movements of the respective arms as the feed bar moves back and forth.

15. The combination of stitch-forming mechanism and a feeding mechanism including a feed bar, feed dogs arranged side by side in advance of the stitching mechanism, arms pivoted to the feed bar in rear of the stitching mechanism and projecting forwardly and supporting the respective feed dogs, a supporting bracket, guideways carried by said bracket for directing the movements of the respective arms as the feed bar moves back and forth, and means whereby said guideways may be adjusted for varying the direction of movement of the feed dogs.

16. In a sewing machine, a feeding mechanism including a main feed dog, and means in front of said main feed dog for feeding the fabric faster in the line of feed than the fabric is fed by the main feed dog, and for simultaneously stretching the fabric transversely of the line of feed.

17. In a sewing machine, the combination of a stitch forming mechanism including a needle, and a feeding mechanism including a main feed dog disposed in rear of said needle, and means in front of said needle for feeding the fabric faster in the line of feed than the fabric is fed by the main feed dog, and for simultaneously stretching the fabric transversely of the line of feed.

18. In a sewing machine, the combination of a stitch forming mechanism including a pair of needles, a cross thread laying mechanism, and means in front of the needles for stretching the fabric in a direction transversely of the line of feed.

19. In a seam covering machine, the combination with a stitch forming mechanism, including a pair of needles and a single looper coöperating therewith, of a cross thread laying mechanism, and means in front of said stitch forming mechanism for stretching the seam in a direction transversely of the line of feed.

20. In a sewing machine, a feeding mechanism including a main feed dog, a pair of combined feeding and stretching dogs arranged at one end of the main feed dog and on opposite sides of the center line thereof, and means for simultaneously actuating all of said dogs to cause the same to intermittently grip and release the fabric.

21. In a sewing machine, a feeding mechanism including a main feed dog, a pair of combined feeding and stretching dogs arranged at one end of the main feed dog and on opposite sides of the center line thereof, means for simultaneously actuating all of said dogs to cause the same to intermittently grip and release the fabric, and means for varying the speed of the combined feeding and stretching dogs relative to the speed of the main feed dog.

22. A sewing machine including in combination, a plurality of needles, a looper cooperating with the needles beneath the work support, a cross thread laying mechanism, means in front of the needles for stretching the material transversely of the line of feed, means in rear of the needles for feeding the fabric sections away from the needles after said fabric sections are stretched, and means for guiding the joined edges of fabric centrally between the needles whereby said joined edges through the stretching action thereon will be drawn down substantially into the plane of the fabric sections and covered while held in such stretched condition.

23. In feeding mechanism for sewing machines, a feed-dog comprising two pivoted feeding sections, having work-engaging surfaces lying substantially in the same plane, means for reciprocating said dog to impart simultaneous feeding movements to said sections, and means for swinging said feeding sections on their pivots during the feeding movements of the feed dog.

24. The combination of stitch-forming mechanism and four-motion feeding mechanism including a main feed-dog for engaging the stitched seam in rear of the stitch-forming mechanism, auxiliary feed-dogs for engaging the fabric in advance of the stitch-forming mechanism, and means for moving said auxiliary feed-dogs away from each other while in engagement with the fabric.

25. The combination of stitch-forming mechanism and four-motion feeding mechanism including a main feed-dog for engaging the stitched seam in rear of the stitch-forming mechanism, auxiliary feed-dogs for engaging the fabric in advance of the stitch-forming mechanism, and means for moving said auxiliary feed-dogs away from each other while in engagement with the fabric, said means being constructed to prevent the mutual approach of said feed-dogs while in engagement with the fabric.

26. The combination of stitch-forming mechanism and four-motion feeding mechanism including a main feed-dog engaging the stitched seam in rear of the stitch-forming mechanism, two auxiliary feed-dogs placed side-by-side and including operative work engaging portions disposed in advance of the stitch-forming mechanism, and means for moving said auxiliary feed-dogs away from each other during the feeding movement thereof.

27. The combination of stitch-forming mechanism and four-motion feeding mechanism including a main feed-dog for engaging the stitched seam in rear of the stitch-forming mechanism, auxiliary feed-dogs including operative work engaging portions disposed in advance of the stitch-forming mechanism, and means for moving said operative work engaging portions in paths inclined away from each other while in engagement with the fabric, whereby the fabric sections will, through the stretching action thereon, be drawn down into substantially the same plane and covered while held in such stretched condition.

28. The combination of stitch-forming mechanism and feeding mechanism including a feed-bar, feed-dogs arranged side-by-side and including feeding teeth disposed in advance of the stitch-forming mechanism, each of said feed-dogs further including an arm movably secured to the feed-bar in rear of the stitching mechanism and projecting forwardly and supporting the respective feeding teeth, and guiding means including guideways adapted to coöperate with the respective arms for directing the movements thereof as the feed-bar moves back and forth.

29. In a sewing machine, the combination with stitch-forming mechanism including a pair of needles and covering thread handling means coöperating therewith to form seam-covering stitches, of means in advance of the needles for stretching and flattening a previously seamed fabric transversely of the line of seam and maintaining it stretched while the previously formed seam is being covered by said stitch-forming mechanism.

30. In a sewing machine, a feeding mechanism including a main feed-dog, a pair of combined feeding and stretching dogs arranged on opposite sides of the center line of the main feed-dog and including operative work-engaging portions disposed in advance of the main feed-dog, and means for simultaneously actuating all of said feed-dogs to cause the same to intermittently grip and release the fabric.

31. In a sewing machine, in combination, a plurality of needles, a covering thread handling implement coöperating therewith, means in advance of the needles for stretching the material transversely of the line of feed, means in rear of the needles for feeding the fabric sections away from the needles after said fabric sections are stitched, and means for guiding the joined edges of the fabric centrally between the needles, whereby said joined edges through the stretching action thereon will be drawn down substantially into the plane of the fabric sections and covered while held in such stretched condition.

32. The combination of stitch-forming mechanism and feeding mechanism including a main feed-dog for engaging the stitched seam in rear of the stitch-forming mechanism, auxiliary feed-dogs for engaging the fabric in advance of the stitch-forming mechanism, and means for moving said auxiliary feed-dogs away from each other while in engagement with the fabric.

33. A feeding mechanism including, in combination, a feed-bar, two feeding elements arranged side-by-side and each including an arm pivotally carried by said feed-bar, a guideway support, and shiftable guideways carried thereby and coöperating with the respective feeding elements for swinging the arms on their respective pivots during the feeding movements of the feed bar.

34. A feeding mechanism including, in combination, a feed-bar, arms pivotally carried by said feed-bar, work feeding teeth sustained by each of said arms, a guideway support, and guideways carried by said support and coöperating with the respective arms for swinging the arms on their pivots during the feeding movements of the feed dog.

35. A feeding mechanism including, in combination, a feed-bar, arms pivotally carried by said feed-bar, work feeding teeth sustained by each of said arms, a guideway support, guideways carried by said support and coöperating with the respective arms for swinging the arms on their pivots during the feeding movements of the feed bar, and means whereby said guideways may be adjusted.

36. A feeding mechanism including, in combination, a feed-bar, two feeding elements arranged side-by-side and sustained by said feed-bar for lateral movements relatively to said feed-bar, guideway supporting means, guideways pivotally mounted on said supporting means and coöperating with the respective feeding elements for controlling the lateral movements thereof as the feed-bar moves back-and-forth, and means whereby said guideways may be adjusted angularly about their respective pivots to vary the amplitude of lateral movement of the feeding elements.

37. The combination of stitch-forming mechanism and feeding mechanism including a feed-bar, arms pivotally carried by the feed-bar in rear of the stitch-forming mechanism and projecting forwardly, feeding teeth sustained by each of said arms in advance of the stitch-forming mechanism, a guideway support and guideways carried by said support for swinging the arms on their respective pivots during the feeding movements of the feed bar.

38. The combination of stitch-forming mechanism and feeding mechanism including a feed-bar, feeding teeth arranged on opposite sides of the line of seam formation and in advance of the stitch-forming mechanism, arms pivoted to the feed-bar in rear of the stitch-forming mechanism and projecting forwardly, each of said arms supporting the feeding teeth on its respective side of the line of seam formation, a guideway support, guide-ways carried by said support for swinging the arms on their respective pivots during the feeding movements of said feed bar, and means whereby said guideways may be adjusted for varying the direction of movement of said feeding teeth.

In testimony whereof I affix my signature in the presence of two witnesses.

DUDLEY S. SEYMOUR.

Witnesses:
   S. George Tate,
   A. F. Bredshall.